United States Patent [19]
Slaughter, Jr.

[11] 3,837,357
[45] Sept. 24, 1974

[54] CHECK VALVE
[75] Inventor: Lomis Slaughter, Jr., Houston, Tex.
[73] Assignee: Anderson, Greenwood Co., Bellaire, Tex.
[22] Filed: June 13, 1973
[21] Appl. No.: 369,724

[52] U.S. Cl. ............. 137/554, 137/516.29, 251/172
[51] Int. Cl. ............................................ F16k 37/00
[58] Field of Search ...... 137/553, 554, 555, 516.29, 137/527, 527.8; 251/298, 172, 173, 299, 300, 301

[56] References Cited
UNITED STATES PATENTS

| | | | |
|---|---|---|---|
| 2,359,338 | 10/1944 | Tyden | 137/554 X |
| 2,509,504 | 5/1950 | Jensen | 137/554 X |
| 2,883,147 | 4/1959 | Mirza et al. | 251/172 |
| 3,371,493 | 3/1968 | Woolley | 251/172 X |
| 3,486,618 | 12/1969 | Wikdahl | 251/172 X |
| 3,550,906 | 12/1970 | Mayers | 251/173 X |
| 3,566,907 | 3/1971 | Sime | 137/553 X |

*Primary Examiner*—William R. Cline
*Attorney, Agent, or Firm*—Jack R. Springgate; Joe E. Edwards; M. H. Gay

[57] ABSTRACT

A check valve having a body with a seat therein surrounding the flow passageway through the body, a valve member mounted within the body for movement to and from sealing engagement with the seat, the seat and valve member coacting to provide a pressure boosted soft seating seal and a metal to metal seal, a plurality of indicating pins supported in the seat and spaced inwardly from the outer of the seat sealing areas, the pins being positioned to be engaged by the valve member on seating, a sensor associated with each of the pins, closure indicating means connected to the sensors with the sensors in series so that actuation of all of the sensors by seating of the valve member actuates the indicating means to indicate closure of the valve member. This abstract is neither intended to define the invention of the application which, of course, is measured by the claims, nor is it intended to be limiting as to the scope of the invention in any way.

6 Claims, 4 Drawing Figures

CHECK VALVE

SUMMARY

The present invention relates to an improved check valve and particularly to a check valve having an indication of closure of the valve member.

A problem encountered with providing a closure indication for a check valve is that some slight movement of the means engaging the valve member is required and such means in prior devices extended through the valve seat at a point providing communication between the upstream and downstream sides thereof. This required a sealing around the engaging means and thus rendered such means less sensitive and therefor unsuitable for critical applications such as nuclear and toxic chemical containments.

It is therefore an object of the present invention to provide an improved check valve having a closure indication which can be adjusted to indicate closure with extreme accuracy.

Another object is to provide an improved check valve in which the closure indication is provided by engagement of the valve member at a point immediately inside of the seating area of the valve member.

A further object is to provide an improved valve closure indicating means for a check valve having a high degree of accuracy and a minimum amount of hysteresis.

BRIEF DESCRIPTION OF THE DRAWINGS

These and other objects and advantages of the present invention are hereinafter described and explained with reference to the drawings wherein:

FIG. 3 is an enlarged partial sectional view to illustrate the primary and secondary sealing seats of the check valve and the relative position of the indicating pins and their sensors.

DESCRIPTION OF THE PREFERRED EMBODIMENTS

Figure 1:
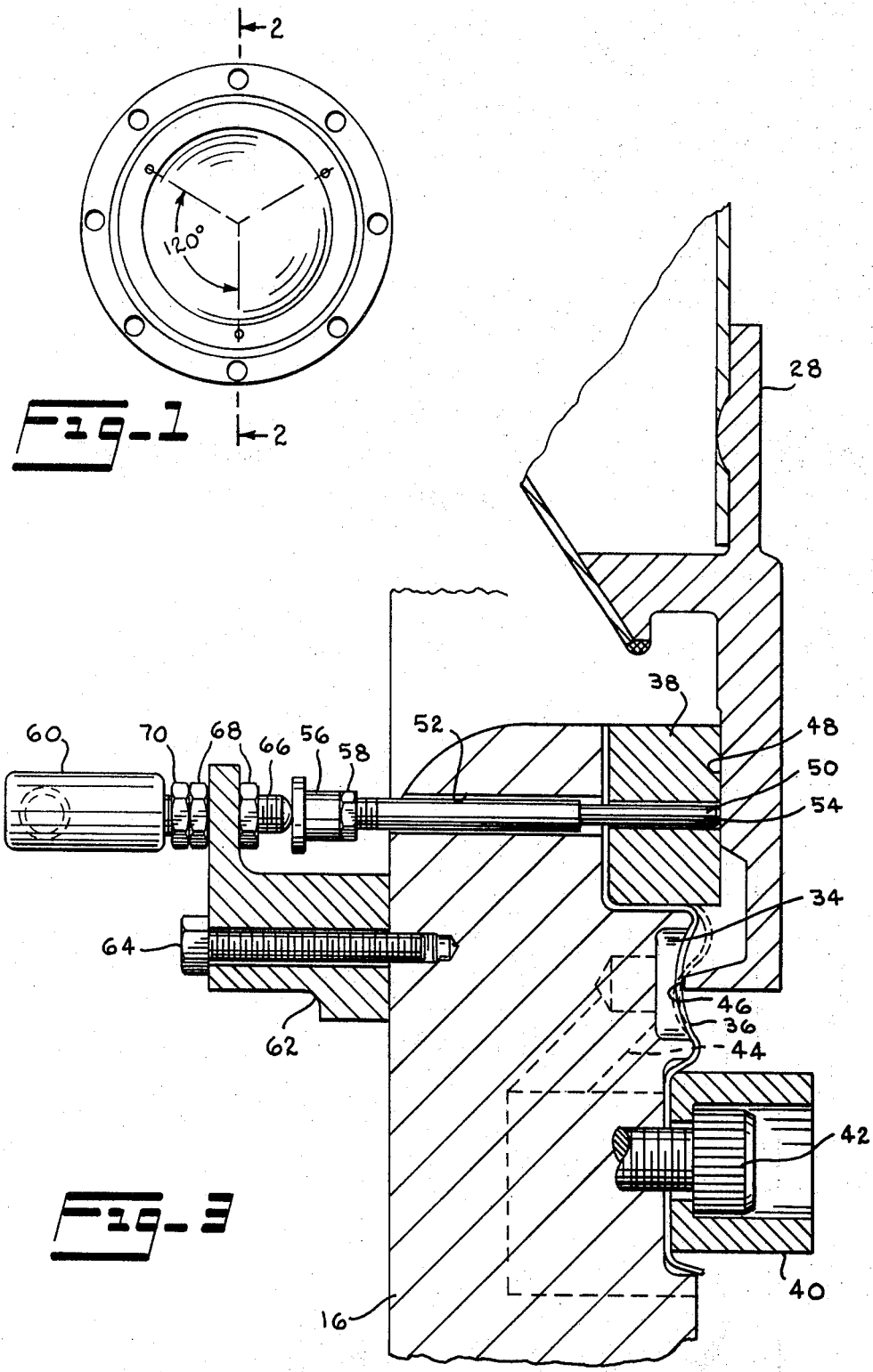
FIG. 1 is an end view of the improved check valve of the present invention.
Figure 2:
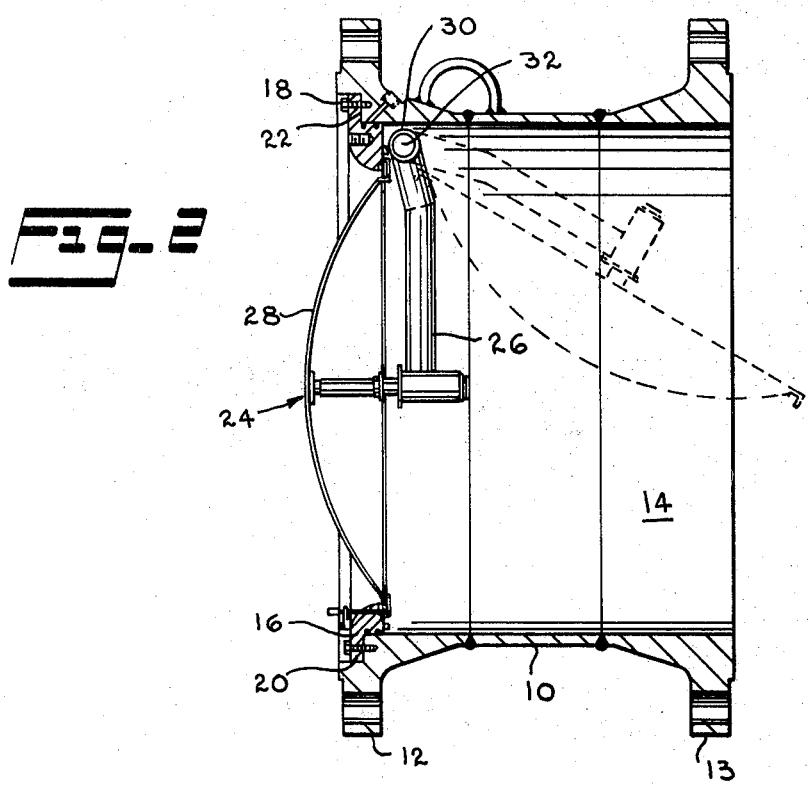
FIG. 2 is a sectional view taken along line 2-2 in FIG. 1.

The improved check valve of the present invention as shown in FIGS. 1 and 2 includes a tubular body 10 with end flanges 12 and 13 welded thereon to provide the means for connecting the check valve into the system which it is to control. With the body 10 being tubular it defines the flow passageway 14 through which a flow stream passes when the check valve is open.

The valve seat ring 16 is secured by the screws 18 in a position so that it surrounds the flow passageway 14. The ring 16 has an outwardly extending flange 20 which is positioned in the counterbore 22 of the body flange 12 and the screws 18 extend through the flange 20 and are in threaded engagement with the body flange 12.

The valve member 24 is pivotally supported within body 10 for movement into and from engagement with the valve seats defined by the seat ring 16. The pivotal support is provided by the arm 26 which extends from a central connection to valve disc 28 to the sleeve 30 surrounding the pin 32 which is mounted within body 10. As shown in dashed lines in FIG. 2, the valve member 24 pivots from its closed position to its open position by pivoting around pin 32.

The valve ring 16 defines an annular moat 34 as best shown in FIG. 3. The diaphragm 36 is held in position spanning the moat 34 by the inner retaining ring 38 and the outer retaining ring 40. As shown ring 40 is secured to seat ring 16 by the screws 42 and ring 38 is similarly secured but the screws are not illustrated. The seat ring 16 defines a passage 44 which provides communication from the high or sealed side of the valve seat to the opposite side of the diaphragm 36. This communication provides a boost pressure under diaphragm to tighten its seal against the lip 46 of valve disc 28 when it is seated on diaphragm 36. Diaphragm 36 thus provides an outer soft seat seal.

Additionally, the inner retaining ring 38 is positioned to engage the sealing surface 48 on the valve disc 28. This seating engagement provides a secondary metal-to-metal seat for the check valve.

On closure, valve member 24 engages indicating pins 50 on the surface 48. There are three such indicating pin assemblies as best seen in FIG. 1. The indicating pins 50 are mounted in the bores 52 and 54 in seat ring 16 and retaining ring 38, respectively. As can be seen the pin 50 is not sealed in the bores 52 and 54 and is thus free to slide therein. The end of pin 50 is made adjustable by the foot 56 threaded thereon and is held in its set position on pin 50 by the lock nut 58.

In order to provide an indication of closure, sensors 60 are used to sense the movement of pins 50 when engaged and moved by closure of valve member 24. The sensors 60 are supported in position aligned with their respective pins 50 by the brackets 62 which are secured to seat ring 16 by the screws 64. The extending arm 66 of each of sensors 16 is adjustable with respect to the pin 50 by the nuts 68 on opposite sides of bracket arm 66 and the lock nut 70.

Figure 4:
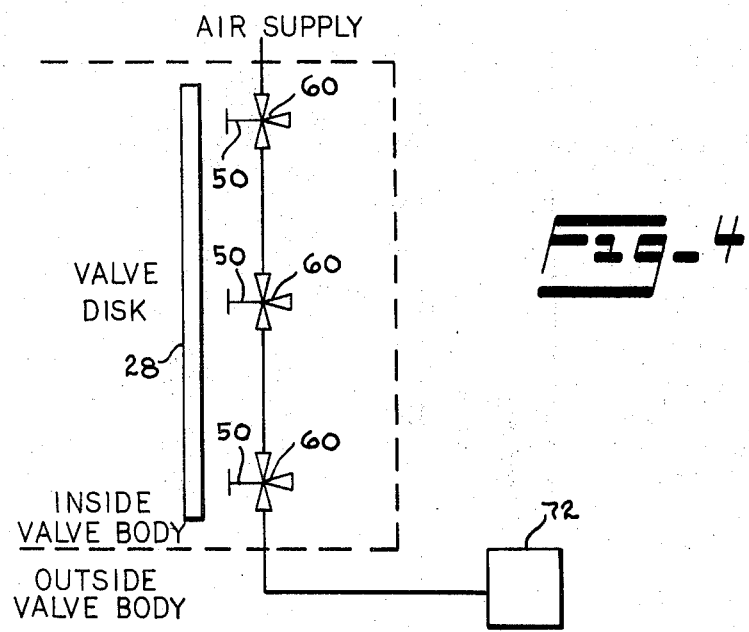
FIG. 4 is a schematic view of a pneumatic closure indicating system.

The pneumatic indicating system is schematically illustrated in FIG. 4 wherein each of the sensors 60 include a valve and the valves are connected in series to a suitable source of air and to the closure indicator 72. Indicator 72 is a suitable type which can provide a visual indication, a permanent record indication, a visual or audible alarm or combinations thereof. With this series connection of sensors 60, the indicator 72 does not indicate closure until all three sensors 60 have been actuated so that the control air is supplied to indicator 72. These sensors might equally well be electrical switches connected in series.

With the adjustment of the length of the pins 50 and of the position of the sensors 60, the closure indication of indicator 72 can be brought into exact adjustment with respect to closure. Only the hysteresis of the sensors 60 cause a slight lag in the indication of opening. Further, the positioning of the indicator pins 50 to avoid the necessity of sealing around them and thus minimize resistance to movement of pins 50.

While a pneumatic indicating system has been shown, it should be understood that an electrical system or any other suitable system can be used and utilize the same configuration with suitable sensors such as microswitches.

As can be seen the improved check valve provides both a pressure boosted diaphragm seating and a metal to metal seating with an indication of closure taken at a point not requiring sealing and extreme accuracy as regards valve angle of opening.

What is claimed is:

1. A check valve comprising
a body defining a passageway therethrough,
a valve seat ring mounted in said body to project into said passageway,
said valve seat ring having an annular resilient seat spaced outwardly from the inner edge of said valve seat ring,
a valve member,
means for mounting said valve member within said body for movement into and from engagement with said annular seat to close and open flow through said passageway,
a plurality of pins extending through said valve seat ring at points inward from said annular seat and adapted to be engaged by said valve member when said valve member is in sealing engagement with said annular seat,
a sensor associated with each of said pins,
said sensors being positioned to be actuated by their pins when said pins are moved by engagement of said valve member, and
means connected to said sensors for indicating the actuation of said sensors to show closure of flow through said passageway by engagement of said valve member on said annular seat.

2. A check valve according to claim 1, wherein said sensors are connected in series whereby said indicating means indicates closure when all of said sensors have been actuated.

3. A check valve according to claim 1, including means for adjusting the relationship between said pins and said sensors.

4. A check valve according to claim 1 wherein three of said pins are included and are spaced substantially equally around the annular seat, 5. A check valve according to claim 1 wherein said seat defines an annular moat and includes an annular diaphragm covering said moat to provide a soft seat for said valve member.

6. A check valve according to claim 5 including
an inner retaining ring
an outer retaining ring,
said retaining rings clamping the inner and outer edges of said diaphragm,
said inner retaining ring defining a secondary seating surface adapted to be engaged by said valve member.

* * * * *